Aug. 8, 1950     W. K. KEARSLEY     2,518,149
FLOWMETER
Filed Nov. 15, 1946
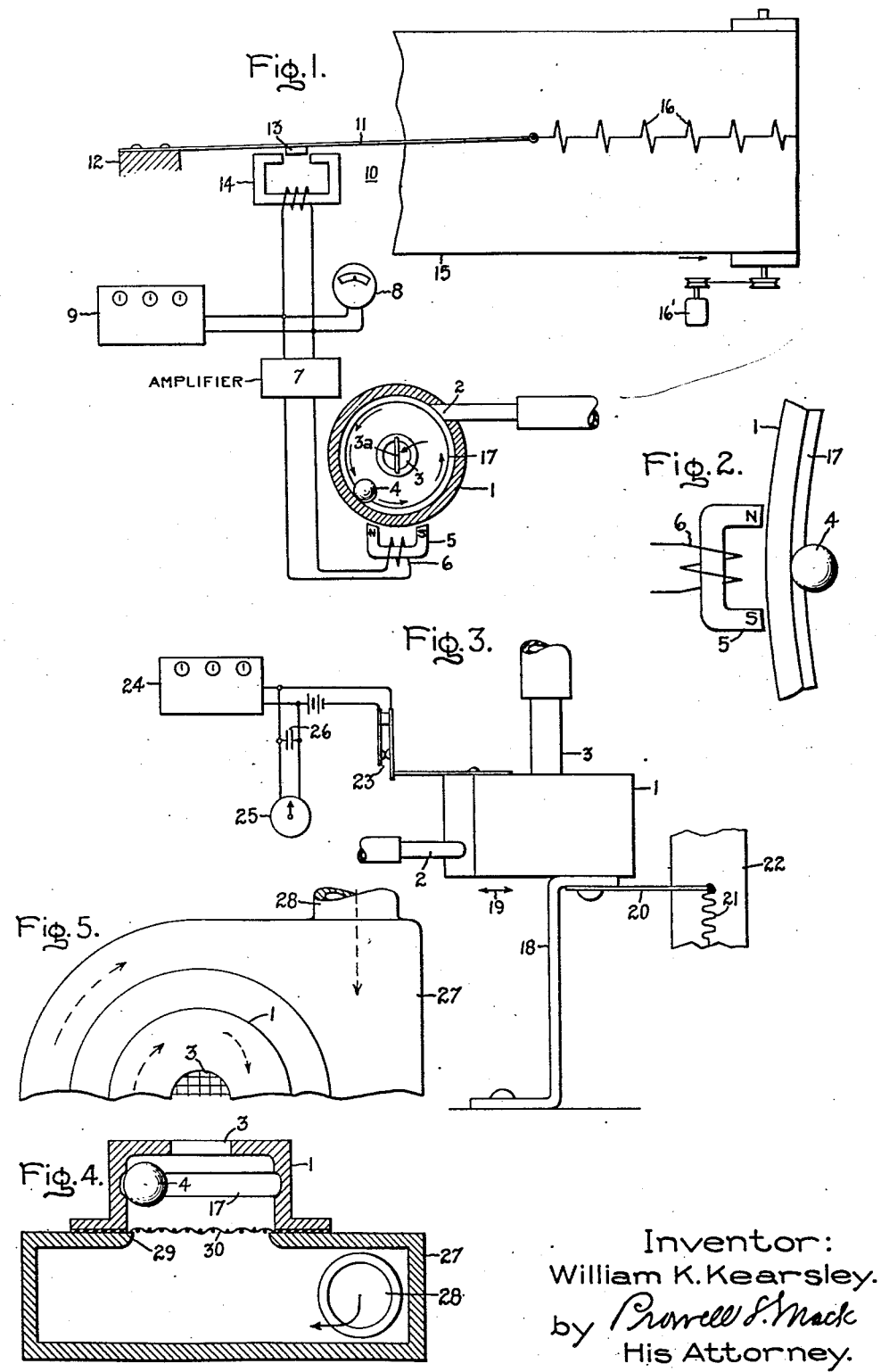
Inventor:
William K. Kearsley.
by Browell S. Mack
His Attorney.

Patented Aug. 8, 1950

2,518,149

UNITED STATES PATENT OFFICE 2,518,149

FLOWMETER

William K. Kearsley, Schenectady, N. Y., assignor to General Electric Company, a corporation of New York Application November 15, 1946, Serial No. 710,163

2 Claims. (Cl. 73—253)

My invention relates to flow meters and while useful for general application it is particularly desirable for the measurement of the flow of liquids, such as liquid oxygen, liquid nitrogen, and the like where the temperature may be very low, the pressure very high, and there is difficulty in maintaining bearings and danger of explosion from leaks, etc.

In the preferred form of my invention I avoid the use of bearings and stuffing boxes entirely, and hence, do not encounter the difficulties of bearing lubricating and wear or leaky stuffing boxes.

I make use of a sealed circular flow meter chamber about and within which a ball is caused to rotate by the swirling action of liquid flow therethrough at a rate proportional to such flow. The movement of the ball about the chamber is detected from the outside by means requiring no opening through the chamber wall, and means are then provided to indicate the rate of rotation and integrate the number of revolutions of the ball in terms of flow.

The features of my invention which are believed to be novel and patentable will be pointed out in the claims appended hereto. For a better understanding of my invention, reference is made in the following description to the accompanying drawing in which Fig. 1 represents an embodiment of my invention employing an electromagnetic detecting arrangement; Fig. 2 represents enlarged details of Fig. 1; and Fig. 3 represents a detecting arrangement actuated by vibration of the flow meter device. Fig. 4 is a sectional view of my flow meter provided with a separate inlet and swirling chamber and Fig. 5 is an end view of Fig. 4.

Referring now to Fig. 1, at 1, I have represented a cross section of a cylindrical casing having a tangentially disposed fluid inlet opening at 2 and an axially disposed fluid outlet opening 3. The casing or chamber is made of a material which is suitable for use with the nature of the liquid which will flow therethrough and where I employ a detector of the type represented in Fig. 1, the casing 1 will be made of nonmagnetic material. For a liquid oxygen flow meter and for many other liquids, the casing 1 may be made of brass and may have a cylindrical interior one inch long and 1½ inches in diameter. The casing is strongly built and hermetically sealed except for the inlet and outlet openings and is adapted for pressures up to the order of 1000 pounds per square inch. Contained within the casing 1 is a free steel ball 4. It will be evident that when liquid flows in the inlet 2 and out at 3, there will be created a tangential swirling action generally spirally to the interior circular wall of the casing as represented by the arrows, and that the ball 4 will be carried along with the liquid. The casing preferably, although not necessarily, rests horizontally on one end so that gravity does not influence the travel of the ball. Centrifugal force causes the ball to travel about the periphery of the chamber in a circular path concentric to and against the interior circular wall thereof, and I have found that the rate of travel is linearly proportional to the rate of liquid flow through the chamber over a wide range of rate of flow and is independent of the liquid pressure for a given liquid. For liquids of different specific gravity the calibration is different. For example, for alcohol, water, liquid oxygen, and liquid nitrogen, the travel of the ball about the casing, for a rate of flow of 40 cubic centimeters per second, was found to be 34, 39, 52½, and 57 revolutions per second, respectively. This particular flow meter had an inlet orifice of 0.09 inch diameter and used a steel ball of ½ inch diameter. The outlet should be appreciably larger than the inlet and preferably has a guard thereover as indicated at 3a to prevent it from becoming blocked by the ball 4. The flow meter is accurate to a slightly lower rate of flow when the ball travels in a horizontal path than when it travels in a vertical circle. However, where the rate of flow is sufficient to lift the ball by the swirling action of the liquid, the meter may be used in any position with good results. When the ball travels in a horizontal circle, the swirling action only needs to be sufficient to move the ball horizontally. It is to be noted that the ball needs to have a specific gravity only slightly greater than the liquid it displaces in order to travel about the periphery of the casing by centrifugal forces. Likewise, because of the apparent lightness of the ball when immersed in a liquid as compared to air, it is easily lifted and moved by the liquid.

In Fig. 1, I detect the rotation of the ball by providing a permanent magnet 5 on the outside and closely adjacent the path of travel of the ball 4. The magnet has a pickup coil 6 thereon. As the ball approaches the magnet it reduces the reluctance of its magnetic circuit and as the ball departs from the magnet the magnetic reluctance of the latter is increased. The resulting variation in flux through the coil 6 induces an alternating voltage therein which may be amplified if necessary by an amplifier represented at 7. One complete cycle corresponds to one complete revolution of the ball about the casing. The amplified voltage may be measured by a voltmeter represented at 8 and may be caused to actuate a counter such as represented at 9 and a recorder such as represented at 10.

The counter 9 may be actuated either by a relay type motor or an alternating current synchronous motor such as is commonly used for driving clocks. The recorder may comprise a resilient pen arm 11 fixed at end 12 and provided with a small magnetic armature 13 cooperating with an electromagnet 14 energized from the output of the amplifier 7. When energized the electromagnet 14 attracts the armature and deflects the pen arm 11 downward against its resiliency. The resulting oscillations of the pen arm are recorded on a moving chart 15. Each wave 16 of the record produced represents one revolution of the ball 4. The chart 15 is advanced at a known constant rate by a suitable timing motor 16.

Fig. 2 shows in greater detail the preferred arrangement of the magnetic pickup of Fig. 1. The inner periphery of the chamber 1 preferably has a groove track 17 for the ball 4 to minimize friction and so that the ball always will pass directly adjacent the magnet 5. The magnet is preferably of horseshoe shape with its pole pieces adjacent to and spaced apart along the track 17, so that as the ball reaches a point between the pole pieces, such as represented in Fig. 2, a very substantial reduction in magnetic reluctance occurs and a substantial voltage variation is produced.

Fig. 3 represents at 1 the same type of ball flow meter as explained in connection with Fig. 1 but with a different type of detector. In Fig. 3 the flow meter casing is mounted on a resilient support 18 and its inlet and outlet pipe couplings will be of sufficient length and flexibility or otherwise arranged as to allow the casing 1 to vibrate in response to the rotation of the ball therein.

The support 18 may be a flat strip of resilient metal, the illustration representing the edge of the strap toward the observer, and the casing 1 is mounted thereon with the ball track horizontal. As the ball rotates, the centrifugal force component thereof acting against the interior circular wall of the casing will then vibrate the assembly back and forth in a horizontal sidewise direction as indicated by the double headed arrow at 19. These vibrations may be recorded directly by a stylus arm 20 recording at 21 on a vertically driven chart 22. Likewise, such vibrations may be used to open and close a contact device 23 included in the direct current energizing circuit of a counter 24 and a voltmeter 25. The voltmeter is suitably damped and is connected in parallel with a condenser 26 so as to receive an average energization current proportional to the rate of opening and closing of contactor 23.

The various instruments will be calibrated with the flow meter apparatus to respond correctly for one particular liquid, and for other liquids known correction factors may be applied.

In the apparatus of Fig. 3 the ball used does not need to be magnetic, nor does the casing 1 need to be non-magnetic. For instance, if the fluid to be measured is an acid, it may be desirable to use glass as the material for both the ball and its casing in order to avoid corrosion.

In some cases I may provide a separate inlet and swirling chamber 27 axially disposed at the end of the flow meter opposite the outlet as represented in Figs. 4 and 5. Such an arrangement becomes desirable where it is desirable that a minimum drop in liquid pressure shall occur through the flow meter. The inlet and separate swirling chamber here represented is of a character found on some forms of lawn sprinklers. A large tangential inlet port 28 is provided in chamber 27. This inlet and swirling chamber is circular except at the corner where the inlet port is provided, and may have a diameter two or three times that of the flow meter chamber 1, and an axial inlet port 29 in the flow meter chamber equal to or slightly smaller than the interior diameter of the flow meter chamber. This inlet port may have a meshed screen 30 thereover to prevent the ball rotor 4 from entering the chamber 27. This arrangement avoids excessive drop in pressure in the flow meter combination and a somewhat more uniform swirling action of the liquid in the ball chamber 1. It is to be noted that should there be air bubbles in the liquid being measured, they will collect at the center of the swirling stream due to centrifugal force and, unless excessive, have no effect on the action of the flow meter.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A flow meter comprising a hollow nonmagnetic casing structure having a cylindrical-shaped interior wall, a tangential inlet port and an axially disposed outlet port for permitting the flow of the liquid to be measured through said casing, such flow being characterized by a swirling action about the circular interior wall of the casing and generally spiral therefrom to the outlet port, a free ball of magnetic material in said casing having a specific gravity greater than the liquid to be measured and of a size to be efficiently driven in a circle against the interior circular wall of the casing by the swirling liquid, a magnet structure exterior of said casing and closely adjacent a point in the path of travel of the ball within the casing, one of said magnetic parts being polarized as a permanent magnet whereby as the ball passes the exterior magnet structure a change of flux is produced therein, a coil on the exterior magnet structure in which a voltage is induced by such change in flux, and means responsive to such voltage for producing a measurement indication of the flow of liquid through said casing.

2. A flow meter comprising a hollow casing of non-magnetic material providing an interior cavity with a cylindrical wall, a tangential inlet port and an axially disposed outlet port in said casing for permitting the flow of the liquid to be measured therethrough and to cause a circular swirling action of the liquid within said casing, a free ball of magnetic material in said casing of greater specific gravity than the liquid to be measured, a circular track about the interior cylindrical wall for said ball, said ball being adapted to be driven about said track in one direction by the swirling action of the liquid flowing through said casing at a speed proportional to the rate of flow, a U-shaped permanent magnet exterior of said casing with its pole pieces spaced apart closely adjacent to and along the path of movement of said ball such that the ball partially bridges the pole pieces of said magnet in passing thereby, and a coil on said magnet in which a voltage is induced by the change in flux of the permanent magnet produced by the movement of said ball.

WILLIAM K. KEARSLEY.

REFERENCES CITED

The following references are of record in the file of this patent:

UNITED STATES PATENTS

| Number | Name | Date |
|---|---|---|
| 799,305 | Crouch et al. | Sept. 12, 1905 |
| 818,566 | Scotti | Apr. 24, 1906 |
| 1,293,984 | Thompson | Feb. 11, 1919 |
| 1,730,118 | Cobb | Oct. 1, 1929 |
| 1,948,104 | Firestone et al. | Feb. 20, 1934 |
| 1,961,007 | Marvin | May 29, 1934 |
| 2,052,673 | Stanton | Sept. 1, 1936 |
| 2,291,291 | Alexander | July 28, 1942 |
| 2,299,406 | Potter | Oct. 20, 1942 |

FOREIGN PATENTS

| Number | Country | Date |
|---|---|---|
| 352,925 | Great Britain | July 14, 1931 |
| 477,584 | Great Britain | Dec. 30, 1937 |